Patented Oct. 4, 1938

2,132,353

UNITED STATES PATENT OFFICE 2,132,353

NITROALCOHOL

Henry B. Hass, West Lafayette, and Byron M. Vanderbilt, Terre Haute, Ind., assignors to Purdue Research Foundation, La Fayette, Ind., a corporation of Indiana No Drawing. Application June 25, 1937, Serial No. 150,311

1 Claim. (Cl. 260—632)

Our invention relates to a new and useful aliphatic nitroalcohol, and, more particularly, to 3-nitro-3-methyl-2-butanol.

The nitroalcohol of our present invention has the following structural formula:

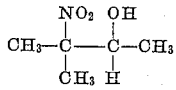

This nitroalcohol may suitably be prepared by previously known methods for introducing the nitro group into an aliphatic compound, as, for example, by reacting silver nitrite with 3-iodo-3-methyl-2-butanol. However, we prefer to prepare this compound in accordance with the process of copending application Serial No. 146,855 of Byron M. Vanderbilt filed June 7, 1937. According to this process a primary or secondary nitroparaffin and an aliphatic aldehyde are reacted in the presence of an auxiliary solvent, such as ethyl alcohol, and in the presence of an alkaline catalyst such as sodium hydroxide, the aldehyde being slowly added to a solution of the nitroparaffin and catalyst in the auxiliary solvent while thoroughly agitating.

The nitroalcohol prepared by the above procedure may be purified according to any of the known means, as, for example, by treating with sodium bisulfite to remove aldehydes or aldehyde condensation products. We prefer, however, to purify this nitroalcohol by aerating the impure compound for one to three hours at elevated temperatures, e. g., 70 to 100° C. The nitroalcohol is subsequently distilled from the resulting polymerized products.

The following example illustrates a suitable procedure for the preparation of the compound specified above:

Example

A solution of 178 parts by weight of 2-nitropropane, 121 parts of 95% ethyl alcohol, and 3.1 parts of 10.4 N sodium hydroxide was prepared, and to this solution was slowly added with thorough agitation 92½ parts of acetaldehyde. The temperature was maintained at approximately 30° C. during this addition. After the addition of the aldehyde 6 parts of water was added in order to allow the mixture to come into one phase. If preferred, this water may be included in the original reaction mixture before the addition of the aldehyde. The resulting mixture was allowed to stand at about 37° C. for 3½ days without further agitation. At the conclusion of this period the sodium hydroxide was neutralized with an exact equivalent of hydrochloric acid and the mixture was distilled under reduced pressure. The distillate was somewhat yellow in color, and was therefore subjected to aeration at 90° C. for two hours. The material was then redistilled under vacuum giving a clear water-white distillate consisting of 3-methyl-3-nitro-2-butanol.

The nitroalcohol prepared as described above was a somewhat viscous colorless liquid having a pleasant, somewhat ester-like odor. The 3-nitro-3-methyl-2-butanol does not solidify at temperatures above 0° C. It is stable up to temperatures of about 100° C. At a temperature of 150° C. it decomposes relatively rapidly turning dark brown after a period of about one hour. This compound is partially miscible with water being soluble to an extent of approximately 21% at 25° C. At the same temperature water is soluble in the nitroalcohol to an extent of approximately 16.5%.

The following physical properties were determined for 3-methyl-3-nitro-2-butanol prepared as above described:

Boiling point at 10 mm_____ 90° C.
Specific gravity $D_4^{25}$ _____ 1.1021
Refractive index at 20° C_____ 1.4469

It is to be understood that the above data were obtained from a single preparation of the above compound and, while such data will be useful in identifying this compound, we do not wish to limit ourselves to a product having the exact constants listed.

The nitroalcohol of the present invention is useful as an organic solvent and constitutes a satisfactory solvent for nitrocellulose. This material can be utilized in any nitrocellulose composition requiring a high boiling solvent. This nitroalcohol is, likewise, useful as an intermediate for the preparation of numerous organic compounds, and various other uses of this material will be apparent to those skilled in the art.

Our invention now having been described, what we claim is:

3-methyl-3-nitro-2-butanol.

HENRY B. HASS.
BYRON M. VANDERBILT.